(12) United States Patent
Zik et al.

(10) Patent No.: US 11,041,709 B1
(45) Date of Patent: Jun. 22, 2021

(54) NONCONTACT, MAGNETIC POSITIONING OF INSPECTION EQUIPMENT

(71) Applicant: Preco, Inc., Somerset, WI (US)

(72) Inventors: John Zik, Hudson, WI (US); Jeff Kaczmarski, Deer Park, WI (US); Jim Borgen, Osceola, WI (US); Antonio Rodriguez, Stillwater, MN (US)

(73) Assignee: PRECO, INC., Somerset, WI (US)

( * ) Notice: Subject to any disclaimer, the term of this patent is extended or adjusted under 35 U.S.C. 154(b) by 0 days.

(21) Appl. No.: 16/790,522

(22) Filed: Feb. 13, 2020

(51) Int. Cl.
| | |
|---|---|
| *G01B 7/31* | (2006.01) |
| *H04N 5/235* | (2006.01) |
| *H04N 5/225* | (2006.01) |
| *G01N 21/89* | (2006.01) |
| *G01C 17/06* | (2006.01) |
| *G01F 1/075* | (2006.01) |
| *G01N 21/958* | (2006.01) |
| *B41C 1/14* | (2006.01) |

(52) U.S. Cl.
CPC ............... *G01B 7/31* (2013.01); *B41C 1/145* (2013.01); *G01C 17/06* (2013.01); *G01F 1/075* (2013.01); *G01N 21/8901* (2013.01); *G01N 21/958* (2013.01); *H04N 5/2253* (2013.01); *H04N 5/2354* (2013.01)

(58) Field of Classification Search
USPC ....................................................... 348/95
See application file for complete search history.

(56) References Cited

U.S. PATENT DOCUMENTS

| | | | | |
|---|---|---|---|---|
| 4,291,987 A | * | 9/1981 | Sick | G01N 21/89 356/431 |
| 6,049,057 A | * | 4/2000 | Imai | B23K 26/00 219/121.7 |
| 6,588,118 B2 | * | 7/2003 | Hellstrom | G01B 7/06 33/501.02 |
| 6,934,029 B1 | * | 8/2005 | Matzan | G01N 21/84 356/430 |
| 7,228,741 B2 | * | 6/2007 | Georgeson | G01N 29/265 73/634 |
| 8,723,074 B2 | | 5/2014 | Sercel et al. | |
| 10,097,743 B2 | | 10/2018 | Rodriguez et al. | |

(Continued)

FOREIGN PATENT DOCUMENTS

| | | |
|---|---|---|
| CN | 1264445 C | 7/2006 |
| KR | 100711173 B1 | 4/2007 |

(Continued)

*Primary Examiner* — Marnie A Matt

(74) *Attorney, Agent, or Firm* — Westman, Champlin & Koehler, P.A.; Z. Peter Sawicki; Amanda M. Prose

(57) ABSTRACT

A laser system and method for inspecting a substrate and/or a laser score formed in a moving web of material during laser processing of the material with a laser processing system having a laser source for generating a laser beam and a lens for focusing the laser beam and reflecting the laser beam onto the advancing web of material where the focal point is directed a selected location on the web to produce the score in the advancing web of material, the score having a depth less than the thickness of the material and measuring the depth at one or more locations on the advancing web of material concurrent with producing the score line and where the material may be a packaging material and the score provided for easy opening of the packaging.

5 Claims, 3 Drawing Sheets

(56) References Cited

U.S. PATENT DOCUMENTS

| | | | |
|---|---|---|---|
| 2008/0055591 A1* | 3/2008 | Walton | G01N 21/8901 |
| | | | 356/237.1 |
| 2009/0028416 A1* | 1/2009 | Floeder | G01N 21/89 |
| | | | 382/141 |
| 2014/0063229 A1 | 3/2014 | Olsson et al. | |
| 2014/0218504 A1* | 8/2014 | Couturier | G01N 21/8901 |
| | | | 348/93 |
| 2018/0050510 A1* | 2/2018 | Beliveau | B31B 70/88 |
| 2019/0145759 A1 | 5/2019 | Dobell et al. | |

FOREIGN PATENT DOCUMENTS

| | | |
|---|---|---|
| KR | 20190111400 A | 10/2019 |
| WO | 2006047305 A2 | 5/2006 |

\* cited by examiner

NONCONTACT, MAGNETIC POSITIONING OF INSPECTION EQUIPMENT

BACKGROUND

The present disclosure relates to a laser processing system for perforating or scoring a material, and more particularly to inspection equipment configured to ensure that the camera and light source remain in alignment with each other as they are adjusted in a cross-web direction.

Lasers are used to perforate flexible packaging films with very small round holes on the order of 60-250 µm in diameter. Most flexible packaging films are produced in wide formats, in the range of 0.9-1.8 m (36"-72") in width, and the perforations are located in various 'lanes' across the width of the film. All equipment required to perforate or inspect the perforations must be adjustable (automatically or otherwise) in the cross-web direction.

The laser perforations in these films are typically designed to allow a specific amount of airflow in/out of the package to enhance the shelf life and freshness of the contents. Since the diameter and roundness of the perforated holes is a critical factor in a package's performance, there are commercially-available systems for measuring the holes as they are produced on production laser equipment. This inspection technology typically involves a camera that is mounted on one side of the moving film and a light source on the opposite side of the moving film. Due to the high precision required in their measurements, these cameras typically have small fields of view that require accurate alignment of light source to the camera.

SUMMARY

One aspect of the present disclosure relates to a method of inspecting a laser perforation being formed in a moving web of material during laser processing of the material. A laser processing system having a laser source for generating a laser beam and a lens for focusing the laser beam and reflecting the laser beam onto the advancing web of material supports inspection equipment. The inspection equipment includes a first inspection device positioned on a first side of the advancing web of material and a second cooperative inspection device positioned on a second, opposing side of the advancing web of material. The first inspection device and the second inspection device are spaced apart and aligned on opposing sides of the advancing web of material. During laser processing a focal point of the laser beam is directed to a selected location on the web to produce the perforations in the material along the advancing web of material. The perforations are inspected at one or more locations on the advancing web of material while maintaining alignment between the first and second inspection devices by way of magnetically coupling the spaced apart inspection devices on opposing sides of the advancing web of material.

The first device is positioned above the advancing web of material and the second device is positioned below the advancing web of material such that the advancing web of material passes through a space between the first and second devices.

A first magnet of a first magnetic polarity is coupled to the first device and a second magnet of a second, opposite magnetic polarity is coupled to the second device.

The first inspection device is moved automatically or manually along a guide rail positioned above the advancing web of material.

The second inspection device follows the moving first inspection device along a second guide rail substantially parallel to the first guide rail and positioned below the advancing web of material.

Another aspect of the present disclosure relates to inspection equipment for a moving web in a laser processing system. The inspection equipment has a first inspection device and a corresponding second inspection device. A first support rail for movably supporting the first inspection device is provided in the laser processing system. A corresponding second support rail is spaced apart from and substantially parallel to the first support rail for movably supporting the second inspection device in the laser processing system. A first magnet is coupled to the first inspection device and a second magnet is coupled to the second inspection device. A space between the first and second inspection devices is configured to allow the moving web to pass there through with sufficient clearance such that the web moves between the first inspection device and second inspection device without contacting the first or second inspection device. Moreover, the first and second inspection devices cooperate to inspect a perforation in the moving web when the devices are aligned.

A magnetic field generated between the first magnet and the second magnet allows the first inspection device to move along the first support rail and the second inspection device to follow along the second support rail maintaining the alignment of the first and second inspection devices across the web of material.

The first inspection device comprises a driven device and the second inspection device comprises a following device.

The first inspection device comprises a camera and the second inspection device comprises a light source.

The first magnet has a first magnetic polarity and the second magnet has a second magnetic polarity opposite the first magnetic polarity. The first and second magnets are one of a permanent magnet or an electromagnet.

The first inspection device is moved in reciprocal directions along the support rail automatically or manually.

Yet another aspect of the present disclosure relates to a laser system for processing a substrate. The laser system has at least one laser source for generating a laser beam and a lens for focusing the laser beam and reflecting the laser beam onto the substrate; an inspection system for the at least one laser source and the inspection system spaced apart from the laser beam and positioned such that the substrate passes within an inspection window of the inspection equipment. The inspection system has a first device movably supported on or in connection with the at least one laser source and on a first side of the substrate and a second device movably supported on a support rail provided across the moving web and on the opposing side of the substrate such that the substrate passes between the first and second device. The first and second devices are aligned on opposite sides of the substrate and alignment of the first and second devices is maintained as the first device is a driven device and the second device is a corresponding following device.

The inspection system comprises a paired first and second device and wherein the laser system further comprises a plurality of inspection systems.

The first device and the second device are magnetically coupled for concurrent movement of the devices to maintain alignment of the devices during inspection.

The first device comprises a camera. The second device comprises a light source, a power meter or a combination thereof.

DRAWINGS

DETAILED DESCRIPTION

Figure 1:
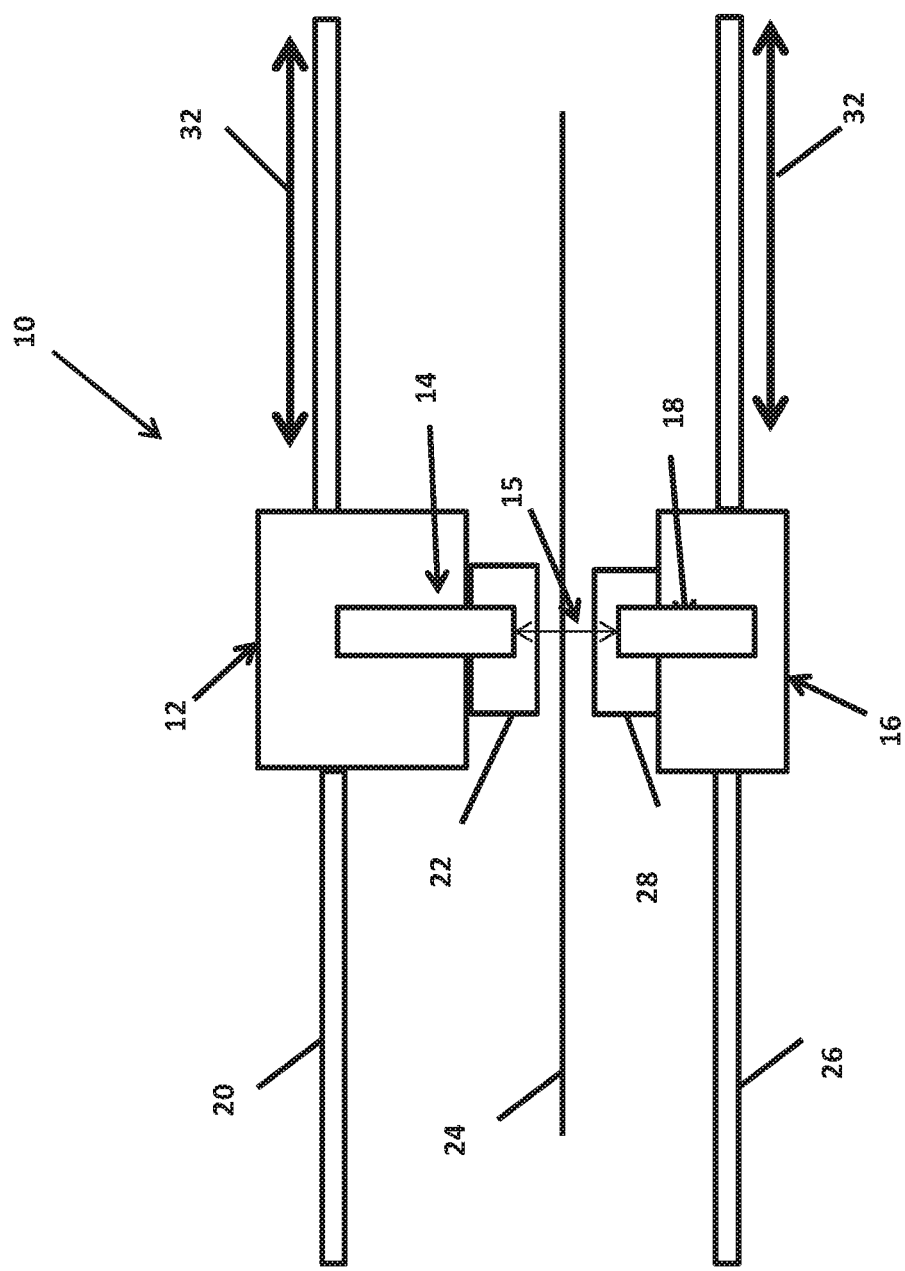
FIG. 1 illustrates an inspection system according to the present disclosure.

The inspection equipment described herein comprises two devices that are magnetically coupled for concurrent movement, with the devices being located on opposite sides of a moving web of film. The devices are each mounted on a linear guide rail that allows the devices to be adjusted manually or automatically across the width of the film or web. A magnetic coupling force is induced between the two devices so that one device, a driven device, is moved and the second device, a following device, is moved along with the driven device. Thus, the two devices, each having an opposite magnetic polarity, are moved concurrently and in a manner to maintain some critical alignment between the two devices.

For example, the two devices are inspection equipment comprising a camera and a light source. Either device may be the driven device or following device.

The inspection equipment is modular and thus a single pair of devices may be spaced apart on opposing sides of a web or film and magnetically coupled to one another for concurrent movement or multiple inspection equipment devices may be spaced apart along or across a web and magnetically coupled through the film passing between the two devices.

The moving web described herein may comprise a material that may be any printed or coated plastic or cellulose film, paper or Aluminum foil material. Additionally, the inspection systems described herein may be used with laser processing systems configured to score any film, paper, foil, metallized material or laminate, such as those produced by adhesive, wax and extrusion lamination. Moreover, the inspection system can be used with laser processing systems used to score mono and co-extruded plastic (multi-layered) films for special applications. Suitable materials include, but are not limited to, plastic and polymeric materials such as polyethylene (PE), linear and low-density polyethylene (LLDPE and LDPE), polyethyleneterephthalate (PET), oriented polypropylene (OPP), or other polymer. Similar polymers such as, for example, metallocene doped polyethylene are also within the scope of the present invention. Generally, the present invention may be used with either multi-layer homogenous or non-homogenous film materials or single-layer film materials of uniform composition. Generally, any type of flexible packaging material may be laser scored and the score line inspected during processing as taught by the present disclosure. For the purpose of this disclosure, thin film material may be any flexible packaging material of either multiple layers of different compositions or a single layer of uniform composition.

The terms score and score line are used interchangeably throughout this disclosure as a score or score line is generated or produced on the web of material and the score or score line is a weakened area in the material that is a trough such as a v-shaped trough or taper in the thickness of the material. The score line is formed by vaporizing specified areas of the film, creating a narrow channel in the material for a tear to follow.

The terms perforation and micro-perforation refer to holes formed in a material such that when the material is used for packaging, the perforations serve purposes ranging from venting to burst protection as well as allowing for reducing the packaging size needed. Micro-perforations in thin films can be used in modified atmosphere packaging. For example, micro-perforations refer to hole sizes in the range of about 50 um to 150 um (0.002 in-0.006 inches) and perforations refer to hole sizes greater than about 150 um.

While the terms "perforation" or "score" may be used herein for purposes of describing inspection of the web or film, the inspection equipment described herein can be used to inspect various laser or other processing results on a web of material including but not limited to scoring, micro-perforating, slitting, or other cutting of the material.

The inspection equipment described herein can be incorporated in any processing system having a web of material capable of passing clearly between the first and second inspection devices, without the material contacting the first or second inspection device.

The inspection and systems described herein can be carried out in real-time and concurrently with the processing of the material. That is, the inspection equipment may be used for inspection of the perforations during production of the score line for purposes of determining if the score is sufficient for a selected end-use. The laser system is configured and controlled to produce a score line having a selected depth where this depth is less than a thickness of the material. Theoretically the depth of the score can be set and controlled in the laser system, however practically there are multiple factors that may affect the actual depth of the score line since the web material is moving and the dynamics of a moving web will produce a margin of error when forming the score. However, using the disclosure herein, such margin of error can be reduced or eliminated by inspection of the score during processing. A feedback loop may be used to adjust the laser to produce the score line depth at one or more selected set points based on the actual measured/inspected depth as sufficient or insufficient.

Referring to FIG. 1, an inspection system 10 comprises a first inspection equipment assembly 12 and a second inspection equipment assembly 16. The first inspection equipment assembly 12 and second inspection equipment assembly 16 are spaced apart within a processing system such that a material 24 for processing is positioned and/or passes between the first inspection equipment assembly 12 and second inspection equipment assembly 16. The assemblies 12 and 16 are magnetically coupled to one another such that critical alignment 15 between inspection equipment 14 and 18 carried by each assembly 12 and 16 can be maintained during processing. That is, the first inspection equipment assembly 12 is an automatically or driven assembly 12 along a guide rail 20 and the second inspection equipment assembly 16 is following assembly 16 along a second guide rail 26.

The camera assembly 12 may be moved in reciprocal directions indicated by arrows 32 along the guide rail 20 automatically or manually and the light source assembly 16 following while retaining and/or maintaining critical alignment with the camera 14 and light 18 for inspection of the film due to the magnetic field generated between the magnet 22 mounted on the camera assembly 12 and the magnet 28 mounted on the light source assembly 16. Moreover, referring to FIG. 2, this inspection device 10 described herein can be used with a web 24 of material of varying thickness and width and incorporation into a laser system 100 is not limited by the orientation of the film and/or the web 24 or the direction of movement 34 of the web or film 24 or the device 10 adjustment direction.

While the embodiments illustrated herein refer to the first inspection assembly 12 comprising a camera 14 and the second inspection assembly 16 comprising an inspection light 18, embodiments are not so limited. It is contemplated and within the scope of this disclosure that the inspection equipment includes alternative equipment for inspection and combinations thereof including but not limited to sensors of various types, a power meter, profilometers and other equipment for inspecting a quality of a laser beam, the cuts made, or the web or film.

While the embodiment illustrated in FIG. 2 and described below refers to installation of one or more inspection systems 10 within a laser processing system 100, the inspection system 10 may be installed in any processing equipment having a web for inspection of the web or the processing equipment.

Figure 2:
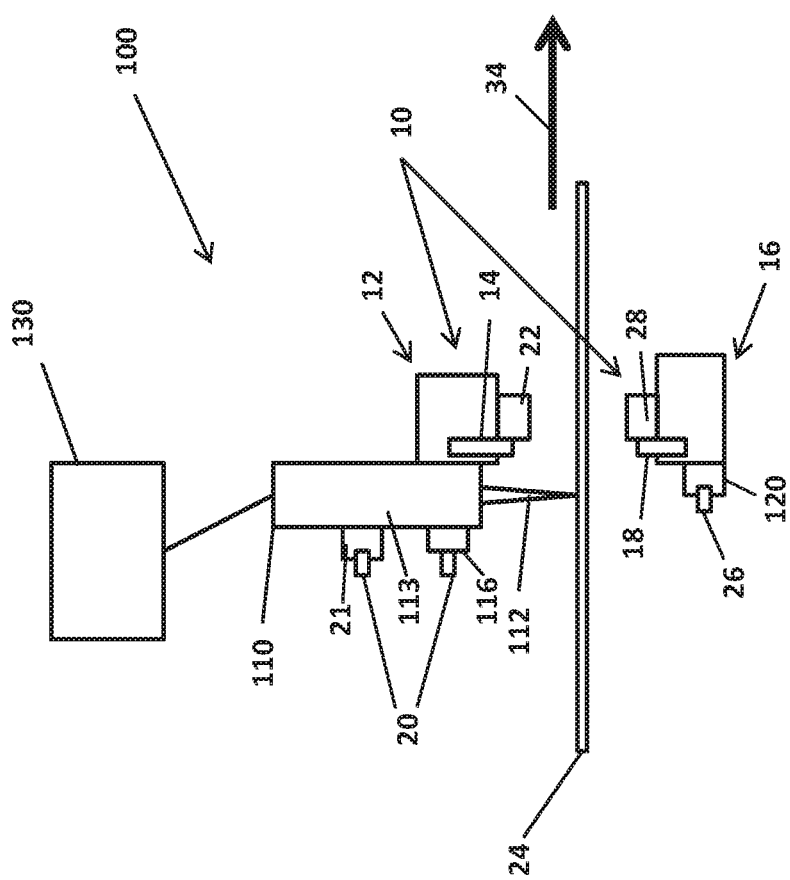
FIG. 2 illustrates the inspection system installed in a laser processing system.

Referring to FIG. 2, the first inspection equipment assembly 12 is also referred to herein as a camera assembly and is movably mounted to a guide rail 20 for linear movement of the camera assembly 12 in reciprocal directions across the web 24. In the embodiment illustrated, the camera assembly 12 may be considered a driven device; such that the corresponding second inspection equipment assembly 16 also referred to herein as a light source assembly 16 is a following device. A magnet 22 such as a permanent magnet, a permanent rare earth magnet, or an electromagnet may be affixed to or near the camera assembly 12 and inline or directly adjacent to one another and positioned such that the magnet 22 is slightly over and/or above the surface of the moving web or film 24, but does not contact the surface of the moving web or film 24. The magnet 22 and camera 14 are moveable together and may be fixed in position with respect to one another on the camera assembly 12.

On an opposite side of the web or film 24, for example a back side or a bottom side of the web or film 24, the light source assembly 16 is also movably mounted on a guide rail 26. The guide rail mounting allows free motion of the light source assembly 16 along with and in the same direction as the camera assembly 12. The use of terms "top" and "bottom" or "back" or "front" are not limiting with respect to the arrangement of the inspection equipment and rather, the orientation of the camera assembly 12 with respect to the light source assembly 16 is only limited by the web or film 24 passing therebetween such that one assembly is on each opposing side of the web or film 24 regardless of the orientation of the web for film within the processing system with which it is installed. A second magnet 28 of opposite polarity such as a second rare earth magnet or electromagnet is affixed to the light source assembly 16. The light source 18 may be affixed directly to and in line with the magnet 28 or adjacent thereto. The magnet 28 and light source 18 are moveable together and may be fixed in position with respect to one another on the light source assembly 16.

As illustrated in the figures, the magnets 22 and 28 are mounted to the respective assemblies 12 and 16 in a manner than does not obstruct the camera 14 or the inspection light beam 18. The camera 14 and light beam 18 are aligned within the construction of the respective assemblies 12 and 16 as installed on the respective guide rail 20 and 26. This alignment may be considered a critical alignment. This critical alignment is then maintained by way of moving the driven assembly 12 and the magnetic field generated therebetween resulting in the corresponding movement of the following assembly 16.

The magnets 22 and 28 are also mounted to the respective assemblies 12 and 16 such that neither magnet 22 or 28 physically contacts the web or film 24. Sufficient clearance between the respective assemblies 12 and 16 and magnets 22 and 28 allow the web or film 24 to pass between the camera assembly 12 and light source assembly 16 without contact. Such spacing is also sufficient to maintain a magnetic coupling between magnets 22 and 28 for following movement of the light source assembly 16 and without interference of adjacent inspection systems 10 installed in the same processing system across a web or film 24 width. The magnets 22 and 28 are also offset from the respective camera 14 and light 18 and may be positioned closer to the web 24 than the camera 14 and/or light 18. The direction of movement of the assemblies 12 and 16 is illustrated by arrows 32 in FIG. 2.

In one embodiment, the inspection system 10 may be positioned at, near, upstream or downstream of the laser beam 12 for purposes of inspecting a score line substantially concurrently with the production of the score line. For example, the camera may be positioned between the laser beam and the magnet or vice versa and thus the light source between the laser beam and the corresponding magnet or vice versa. In the embodiments illustrated in the figures, the first inspection assembly 12 is coupled to a laser source 110 at a location near and/or downstream of the laser beam 112. The laser source 110 has a housing 113 to which one or more bearings 21 are secured. The bearings 21 allow the laser source 112 to be movably coupled to the guide rail 20 for linear movement on the rail 20. A brake 116 may also be coupled to the housing 113 for controlling movement of the laser source 110 and thus the camera assembly 14 along the guide rail. The brake 116 may comprise a magnet. The guide rail 20 may also be movable to selected positions in the laser processing system 100 with respect to the web 24. The guide rail 20 is supported by and within a housing of the laser processing system 100 and is a gantry for moving the laser source(s) 110 during laser processing.

It is contemplated and within the scope of this disclosure that one or more laser sources 110 may be positioned on the guide rail 20, which extends across the width of the web, which is transverse to the direction of travel 34 of the web 24. Thus, as the laser source 110 is moved for moving the laser beam 112 during scoring or other processing of the web 24, the camera assembly 12 is also moved concurrent therewith. The camera 14 follows the score line formed by the laser beam 112 within its respective inspection window.

The camera assembly 12 is coupled to the laser source 110 with a securing means or fastener, examples of which include but are not limited to a bracket for positioning the camera assembly 12 near and/or downstream of the laser beam 112. The camera magnet 22 is secured to a lower securing means or fastener, such as a bracket or portion of the assembly 12 so as to protrude downwardly from the position of the laser source 112 towards the substrate 24.

As illustrated in FIG. 2 the second guide rail 26 is positioned on the opposite side of the web 24. The second guide rail 26 is supported by and within the laser processing system 100 in a direction spaced apart from and parallel to the first guide rail 20. Thus, the guide rail 26 similarly extends across the web 24 and may also be movable to selected positions in the laser processing system 100 with respect to the web 24. That is, the guide rails 20 and 26 may move in the web direction while the camera assembly 12 and light source assembly 16 coupled to the respective guide rail 20 and 26 move in directions transverse to the web direction (e.g., across) as illustrated by arrows 32.

The inspection light source assembly 16 may be provided with a bracket and bearing 120 which slidably connects or couples the light source assembly 16 to the guide rail 26 to allow the inspection light 18 to slide across the width of the web 24 concurrently with the camera 14 while the camera 14 is moved along the width of the web 24. Such movement maintains critical alignment of the camera 14 and inspection light 18. The guide rails 20 and 26 may be moved along the web direction in tandem as part of laser processing controls. Each light source 18 is powered by the laser system 100 via connections which accommodate movement of the light source 18.

The light source assembly 16 supports the magnet 28 and which is secured to and supported by the mounting to the guide rail 26. The light 18 is mounted below and may be aligned with the magnet in one or more directions or offset from the position of magnet 28

Figure 3:
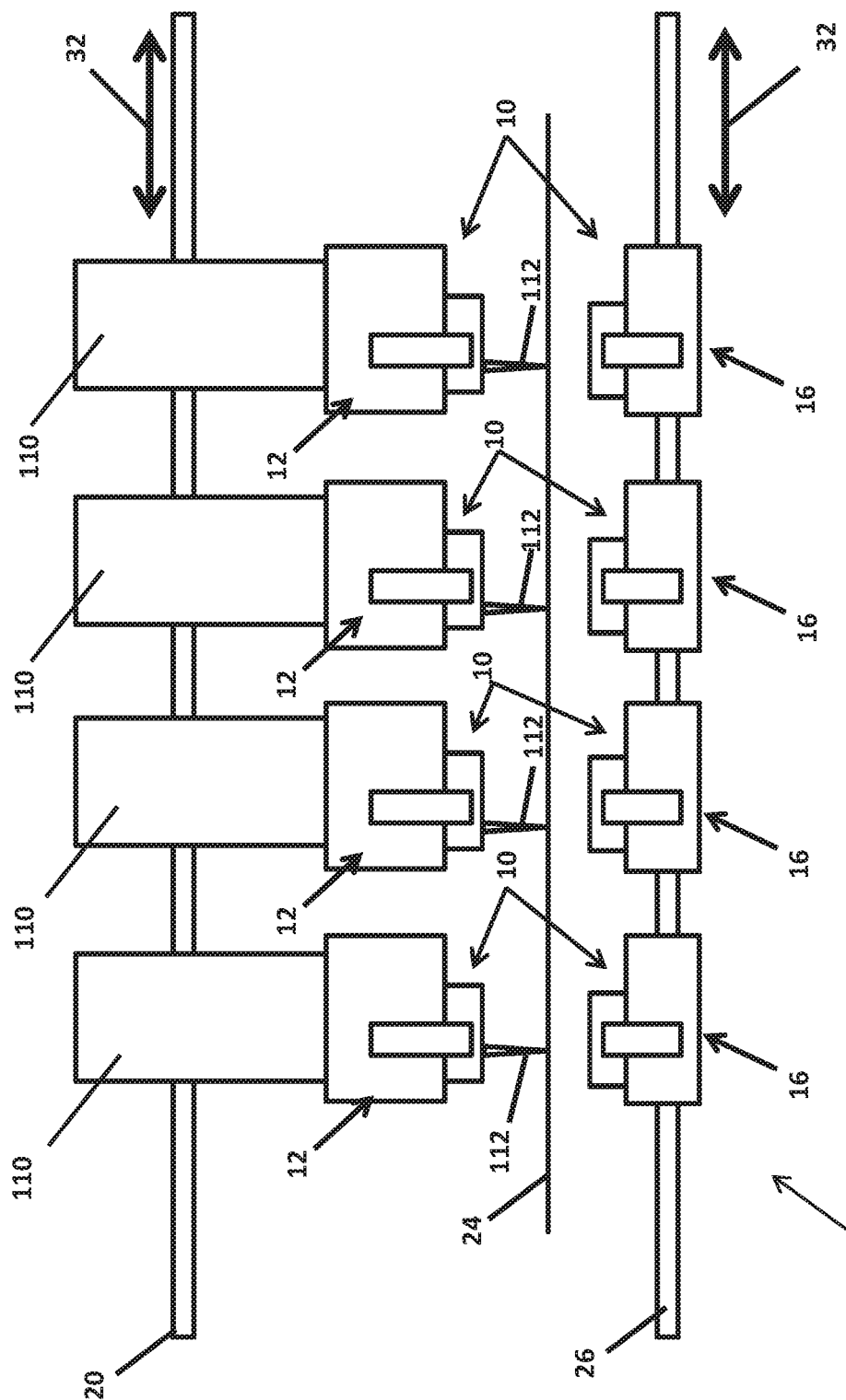
FIG. 3 illustrates a plurality of inspection systems installed in a laser processing system.

As illustrated in FIG. 3, one or more inspection systems 10 may be installed across a web 24 in a laser processing system 100. The laser processing system 100 may be a laser perforating system as described above. For example, the system 100 may have as many as four systems across a web and four rows down the web to provide sixteen laser inspection systems 10 as one laser inspection system 10 is provided for each laser beam 112 generated in the laser processing system 100. However, fewer and more systems 10 may be incorporated in a laser processing system 100. Each system 10 may be automatically moved to different lateral positions across a width of the web or film 24 being processed, or in advance of laser processing a material with the laser system.

The laser system 100 generally comprises at least one laser source 110 for generating a laser beam 112. The laser beam 112 is directed through a focusing lens for directing the laser energy to the web of material 24 for producing a score line. In the embodiment illustrated, the web of material 24 is a moving web of material which may be a thin film of material and the web direction (direction of movement through the system 100) is indicated by arrow 34. Each inspection system 10 provides an inspection window on the moving web of material 24 as it relates to the laser source for which it is installed.

The methods described herein may be carried out using a laser assembly and laser processing method for processing a material through the use of laser beam technology. Lasers provide a very efficient method of cutting, scoring, perforating or otherwise preparing selected materials for various end uses over the old mechanical systems, which may include die systems or pin type roller perforators. Lasers cut, score, or perforate the material through the use of a collimated amplified beam of light that terminates in a focal point. It is at or near the focal point of the beam that processing typically occurs. Intense energy at the focal point processes the material in what can be described as essentially a vaporizing, burning or ablating process.

Although the present invention has been described with reference to preferred embodiments, workers skilled in the art will recognize that changes may be made in form and detail without departing from the spirit and scope of the invention.

What is claimed is:

1. A method of inspecting a laser perforation being formed in a moving web of material during laser processing of the material, the method comprising:
   providing a laser processing system having a laser source for generating a laser beam and the laser processing system comprising a lens for focusing the laser beam and
   reflecting the laser beam onto the advancing web of material;
   providing inspection equipment comprising a first inspection device movably coupled to a housing of the laser source and positioned on a first side of the advancing web of material and second cooperative inspection device positioned on a second, opposing side of the advancing web of material such that the first inspection device and the second inspection device are aligned on opposing sides of the advancing web of material;
   directing a focal point of the laser beam to a selected location on the web to produce the perforations in the material along the advancing web of material; and
   inspecting the perforations at one or more locations on the advancing web of material while maintaining alignment between the first and second inspection device by way of magnetically coupling the spaced apart devices on opposing sides of the advancing web of material.

2. The method of claim 1 wherein the first device is positioned above the advancing web of material and the second device is positioned below the advancing web of material such that the advancing web of material passes through a space between the first and second device.

3. The method of claim 1 wherein a first magnet of a first magnetic polarity is coupled to the first device and a second magnet of a second, opposite magnetic polarity is coupled to the second device.

4. The method of claim 1 and automatically or manually moving the first inspection device linearly along a first guide rail positioned above the advancing web of material.

5. The method of claim 4 wherein the second inspection device follows the moving first inspection device along a second guide rail substantially parallel to the first guide rail and positioned below the advancing web of material.

\* \* \* \* \*